United States Patent [19]

Gorog et al.

[11] 4,341,472
[45] Jul. 27, 1982

[54] METHOD AND APPARATUS FOR POSITIONING A TAPERED BODY

[75] Inventors: Istvan Gorog; Marvin A. Leedom; James P. Wittke, all of Princeton, N.J.

[73] Assignee: RCA Corporation, New York, N.Y.

[21] Appl. No.: 187,158

[22] Filed: Sep. 15, 1980

[51] Int. Cl.³ .............................................. G01B 11/00
[52] U.S. Cl. .................................... 356/399; 356/375; 250/561; 33/1 M; 33/286
[58] Field of Search ............... 356/373, 375, 384, 385, 356/399, 400, 401; 250/202, 203 R, 561; 33/1 M, 286

[56] References Cited

U.S. PATENT DOCUMENTS

| | | | |
|---|---|---|---|
| 3,718,823 | 2/1973 | Niikura et al. | 250/561 |
| 3,947,129 | 3/1976 | Wiklund | 356/385 |
| 4,054,388 | 10/1977 | Marsh et al. | 356/400 |
| 4,114,034 | 9/1978 | Hunka . | |

OTHER PUBLICATIONS

Eisenstadt et al. "Automatic Semiconductor Positioning System"; *IBM Technical Disclosure Bulletin*, vol. 14 No. 11 (Apr. 1972) pp. 3370-3371.

Carson et al. "Measurement System with Position-Sensing Diode Array" *IBM Technical Disclosure Bulletin*, vol. 21, No. 2 (Jul. 1978) pp. 741-742.

*Primary Examiner*—R. A. Rosenberger
*Attorney, Agent, or Firm*—Birgit E. Morris; Donald S. Cohen; Thomas H. Magee

[57] ABSTRACT

A technique for positioning a body having a tapered profile when viewed along a first axis comprises exposing the body to a first beam of light oriented along the first axis in a manner such that the tapered profile is projected as a first image onto a first linear array of photodectors disposed along a direction orthogonal to both the first axis and the direction of the taper. The body is exposed to a second beam of light oriented along a second axis orthogonal to the first axis in a manner such that a second profile of the body is projected as a second image onto a second linear array of photodetectors disposed along a direction parallel to the first axis. The body is then moved along the first and the second axes until the first and the second images strike predetermined locations along the first and second photodetector arrays. The location of the body is also changed along a third axis, orthogonal to the first and the second axes, until the width of the first image equals a predetermined width measured by the linear magnitude of the first image along the first photodetector array.

10 Claims, 3 Drawing Figures

METHOD AND APPARATUS FOR POSITIONING A TAPERED BODY

This invention relates to a technique for positioning a stylus tip having a tapered profile.

BACKGROUND OF THE INVENTION

Information playback systems frequently utilize a stylus for reading signals from the surface of an information record, typically a plastic disc, that contains stored video and audio information. In some systems the information record has a fine spiral groove to guide the tip of a stylus that contains a thin electrode. In these systems, the stylus tip is typically micromachined from natural or synthetic diamond. The stylus tip is tapered to form the prow of the tip, and is also lapped to form a keel having a V-shaped shoe for its bottom portion. This keel-shaped tip has a shoe length of about 3 to 4 micrometers and a thickness of about 2 micrometers.

In manufacturing stylus tips for use in such video disc playback systems, the tip of the diamond stylus is inspected with a high-power optical microscope havihg 1000× to 1500× magnification. Since the field of view of such an instrument is so small, it is laborious and time consuming to bring the stylus tip into focus by manual adjustments. One possible method for facilitating alignment of the stylus tip is to insert the tip into a conical or grooved structure, made of glass, for guiding the tip into the field of view. An index-matching immersion oil is utilized to permit high-resolution examination of the tip through the glass structure. Such a method not only raises the possibility of mechanical damage during the alignment, but necessitates removal of the immersion oil after the inspection has been made. The present invention provides a novel method and apparatus for rapidly and automatically positioning a tapered stylus tip which does not require any contacting of the tip.

SUMMARY OF THE INVENTION

The present invention comprises a technique for positioning a body having a tapered profile when viewed along a first axis. The technique includes exposing the body to a first beam of light oriented along the first axis in a manner such that the tapered profile is projected as a first image onto a first linear array of photodetectors disposed along a direction orthogonal to both the first axis and the direction of the taper. The body is exposed to a second beam of light oriented along a second axis orthogonal to the first axis in a manner such that a second profile of the body is projected as a second image onto a second linear array of photodetectors disposed along a direction parallel to the first axis. The body is then moved along the first and the second axes until the first and the second images strike predetermined locations along the first and second photodetector arrays. The location of the body is also changed along a third axis, orthogonal to the first and the second axes, until the width of the first image equals a predetermined width measured by the linear magnitude of the first image along the first photodetector array.

DETAILED DESCRIPTION OF THE INVENTION

Figure 1:
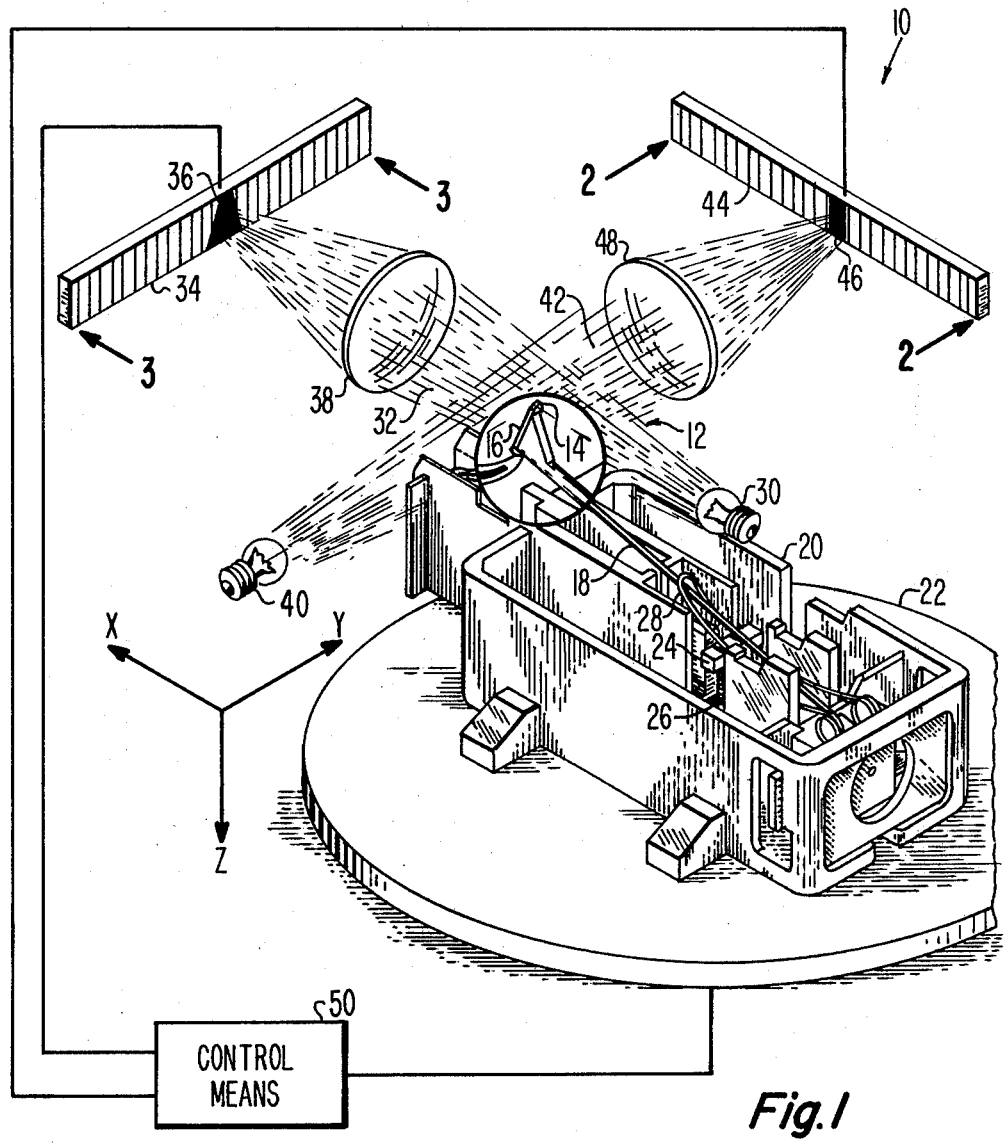
FIG. 1 is a perspective diagrammatic view illustrating the present novel invention.

In FIG. 1 of the drawing, there is shown one embodiment of an apparatus 10 utilized for positioning a body 12 having a tapered profile when viewed along a first axis oriented along the x direction. In the present example, the body 12 comprises a wedge-shaped tip 14 of a stylus 16, which is held at the end of an arm 18 situated in a video disc player cartridge 20. The cartridge 20 is supported on a translational stage 22, in an inverted orientation, in a manner such that the tip 14 is held in a visible position, as shown in FIG. 1. The translational stage 22 may comprise any type of servo-driven means for moving the cartridge 20 along not only the first axis but also a second and a third axis, the second and third axes being substantially orthogonal to each other and also to the first axis in order to provide three-dimensional movement to the cartridge 20. The second and third axes are oriented along the y and z directions, respectively, as illustrated in FIG. 1. In the present embodiment, the translational stage 22 has a support member 24 which projects through an opening 26 into the cartridge 20 and contacts an arm-retaining spring 28, thereby allowing the arm 18 to hold the tip 14 in a visible position outside the body of the cartridge 20.

The apparatus 10 further comprises a first light source 30 positioned to expose the stylus tip 14 to a first beam 32 of light oriented along the first axis, as shown in FIG. 1. A first linear array 34 of photodetectors is disposed along a direction substantially orthogonal to both the first axis and the direction of the taper (the z direction in FIG. 1) in a position such that the linear section across the tapered profile is projected by the first light beam 32, as a first silhouette-like image 36, onto the first photodetector array 34. Preferably, an optical lens 38 is disposed between the stylus tip 14 and the first photodetector array 34 for focusing the first light beam 32 onto the first array 34, as illustrated in FIG. 1.

A second light source 40 is positioned to expose the stylus tip 14 to a second beam 42 of light oriented along the second axis (y direction), which is substantially orthogonal to the first axis (x direction). A second linear array 44 of photodetectors is disposed along a direction substantially parallel to the first axis in a position such that a second linear section across the stylus tip 14 is projected by the second light beam 42, as a second silhouette-like image 46, onto the second photodetector array 44. Preferably, a second optical lens 48 is disposed between the stylus tip 14 and the second photodetector array 44 for focusing the second light beam 42 onto the second array 44, as shown in FIG. 1.

In the present embodiment, the first and second light sources 30 and 40 comprise incandescent light bulbs, and the first and second photodetector arrays 34 and 44 comprise photodiode arrays. Preferably, each photodiode array comprises a selfscanning array containing up to 1,024 individual photodiodes which are internally scanned to provide a position monitoring capability. Such an array is available as an integrated circuit-type package with a ground and polished quartz window, commercially available as RL1024S from Reticon, Sunnyvale, California.

The preferred embodiment of the present apparatus 10 further comprises control means 50 for receiving output signals generated by the photodetector arrays 34 and 44, and utilizing the signals for servo-driving the translational stage 22 in a manner such that the locations of the first and second images 36 and 46 along the first and second photodiode arrays 34 and 44, respectively, are thereby automatically adjusted to strike the predetermined locations. The control means 50 may comprise any known drive and signal processing circuitry with a feedback capability for automatically driving servo motors (not shown) utilized to move the translational stage 22.

The method of positioning the stylus tip 14 comprises exposing the tip 14 to the first beam 32 of light which is oriented along the first axis (x direction) in a manner such that a linear section across the tapered profile is projected as the first silhouette-like image 36 onto the first linear array 34 of photodiodes disposed along a direction substantially orthogonal to both the first axis and the direction of the taper. The stylus tip 14 is also exposed to the second beam 42 of light oriented along the second axis (y direction) in a manner such that the second linear section across the tip 14 is projected as the second silhouette-like image 46 onto the second linear array 44 of photodiodes disposed along a direction substantially parallel to the first axis. The cartridge 20 is supported on the translational stage 22 in a manner such that the first and second images 36 and 40 always strike somewhere along the first and second photodiode arrays 34 and 44. Preferably, the first and second light beams 32 and 42 are focused onto the first and second photodiode arrays 34 and 44, respectively, by utilizing the optical lenses 38 and 48, as shown in FIG. 1. The lenses 38 and 48 project a sharp image of the tip profile onto the photodiode arrays 34 and 44.

Figure 2:
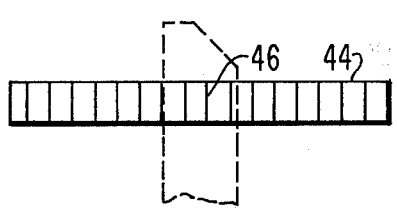
FIG. 2 is a cross-sectional view taken alone line 2—2 of FIG. 1.
Figure 3:
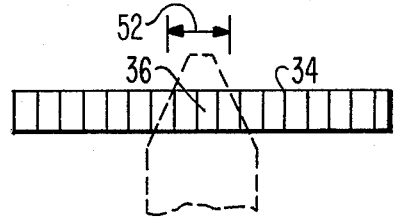
FIG. 3 is a cross-sectional view taken along line 3—3 of FIG. 1.

The stylus tip 14 is then moved along the first and second axes until the first and second images 36 and 46 strike predetermined locations along the first and second photodiode arrays 34 and 44, as illustrated in FIGS. 2 and 3. For example, the translational stage 22 moves the cartridge 20 along the first axis (x direction) until the second image 46, illustrated as a dotted line in FIG. 2, strikes a predetermined segment of photodiodes along the second photodiode array 44. The linear array 44 senses the edge locations of the silhouette-like image along the array 44 by determining whether or not the light beam 42 strikes a particular diode along the array 44. Light incident on these diodes is converted to electric charge which is integrated and stored on the diode capacitance until readout, which is typically controlled by a shift register to obtain an output signal. The output signal is then a discreet time analog representation of the spacial distribution of light intensity across the array 44. This output signal is electroncially monitored by the control means 50 and utilized to drive the translational stage 22 along the first axis. In a similar manner, the cartride 20 is moved along the second axis (y direction) until the first image 36, illustrated as a dotted line in FIG. 3, strikes a predetermined segment of diodes along the first photodiode array 36.

The location of the stylus tip 14 is also changed along the third axis (z direction) until the width 52 of the first image 36, as measured by the linear magnitude of the first image 36 along the first photodiode array 34, equals a predetermined width. Since the stylus tip 14 has a tapered profile when viewed along the first axis (x direction), any change in elevation of the tip 14 along the third axis (z direction) will be reflected by a change in the width 52 of the first image 36 along the first array 34. In other words, the width 52 becomes larger as the tip is elevated, and as the tip is lowered, the width 52 becomes smaller. The output signal generated by the first photodiode array 34 is then representative not only of the location of the incident light along the array 34 but also the width 52 of the incident light, which can be used to set the vertical position of the stylus tip 14 to within the depth of view of a microscope.

In the present embodiment, the output signals generated by the photodiode arrays 34 and 44 are then transmitted to the control means 50 for servo-driving the translational stage 22 in a manner such that the locations of the first and second images 36 and 46 along the first and second photodiode arrays 34 and 44, respectively, are thereby automatically adjusted to strike the predetermined locations. These predetermined locations are established so that the tip 14 is properly positioned, such as for microscopic viewing, when the first and second images 36 and 46 strike the predetermined locations.

The present method and apparatus can be used to quickly position a body having a tapered profile. In particular, by using the linear scan signals from the two photodiode arrays 34 and 44, together with a fast, automatic servo-drive system, the stylus tip 14 can be brought to the desired imaging position of a high-powered microscope without mechanical contact to the tip 14 and without the use of index-matching immersion oils that must later be removed.

What is claimed is:

1. A method of positioning a body having a tapered profile when viewed along a first axis, comprising the steps of:

exposing said body to a first beam of light oriented along said first axis in a manner such that a linear section across said tapered profile is projected as a first silhouette-like image onto a first linear array of photodetectors disposed along a direction substantially orthogonal to both said first axis and the direction of said taper, exposing said body to a second beam of light oriented along a second axis substantially orthogonal to said first axis in a manner such that a second linear section across said body is projected as a second silhouette-like image onto a second linear array of photodetectors disposed along a direction substantially parallel to said first axis, moving said body along said first and said second axes until said first and said second images strike predetermined locations along said first and said second photodetector arrays, and changing the location of said body along a third axis, orthogonal to said first and said second axes, until the width of said first image equals a predetermined with measured by the linear magnitude of the first image along said first photodetector array.

2. A method as recited in claim 1 wherein said body comprises the tip of a stylus held in a visible position by a cartridge, and wherein said moving and said changing steps are performed by supporting said cartridge on a translational stage for moving said cartridge along said first, said second, and said third axes.

3. A method as recited in claim 2 further comprising the step of transmitting output signals generated by said photodetector arrays to control means for servo-driving said translational stage in a manner such that the locations of said first and said second images along said first and said second photodetector arrays, respectively, are thereby automatically adjusted to strike said predetermined locations.

4. A method as recited in claim 3 further comprising the step of focusing said first and said second light beams onto said first and said second photodetector arrays, respectively, by utilizing optical lenses disposed between said stylus tip and each of said photodetector arrays.

5. A method as recited in claim 4 wherein each of said light beams emanate from an incandescent light bulb, and wherein said first and said second photodetector arrays comprise photodiode arrays.

6. An apparatus for positioning a body having a tapered profile when viewed along a first axis, comprising:
a first light source positioned to expose said body to a first beam of light oriented along said first axis,
a first linear array of photodetectors disposed along a direction substantially orthogonal to both said first axis and the direction of said taper in a position such that a linear section across said tapered profile is projected by said first light beam, as a first silhouette-like image, onto said first photodetector array,
a second light source positioned to expose said body to a second beam of light oriented along a second axis substantially orthogonal to said first axis,
a second linear array of photodetectors disposed along a direction substantially parallel to said first axis in a position such that a second linear section across said body is projected by said second light beam, as a second silhouette-like image, onto said second photodetector array,
means for moving said body along said first and said second axes to allow said first and said second images to strike predetermined locations along said first and said second photodetector arrays, and
means for changing the location of said body along a third axis, orthogonal to said first and said second axes, in order to allow the width of said first image to equal a predetermined width measured by the linear magnitude of the first image along said first photodetector array.

7. An apparatus as defined in claim 6 wherein said body comprises the tip of a stylus held in a visible position by a cartridge, and wherein said moving and said changing means comprises a translational stage adapted to support said cartridge and move said cartridge along said first, said second, and said third axes.

8. An apparatus as defined in claim 7 further comprising control means for receiving output signals generated by said photodetector arrays and utilizing said signals for servo-driving said translational stage in a manner such that the locations of said first and said second images along said first and said second photodetectors arrays, respectively, are thereby automatically adjusted to strike said predetermined locations.

9. An apparatus as defined in claim 8 further comprising two optical lenses disposed between said stylus tip and said first and said second photodetector arrays, respectively, for focusing said light beams onto said photodetector arrays.

10. An apparatus as defined in claim 9 wherein said first and said second light sources comprise incandescent light bulbs, and wherein said first and said second photodetector arrays comprise photodiode arrays.

* * * * *